Patented Jan. 4, 1949

2,457,808

UNITED STATES PATENT OFFICE 2,457,808

FLUORESCENT RED CELLULOSE ACETATE FIBERS

Robert G. Dort, Summit, N. J., assignor to Celanese Corporation of America, a corporation of Delaware No Drawing. Application March 14, 1945, Serial No. 582,811

2 Claims. (Cl. 8—57)

This invention relates to the preparation of colored fabrics, and relates more particularly to the production of fabrics woven of continuous or staple lengths of artificial filamentary materials such as, for example, regenerated cellulose, cellulose acetate, or other organic derivative of cellulose, which are brightly colored when viewed under visible light and which, in addition, exhibit a high degree of fluorescence under the influence of ultra-violet light.

An object of this invention is the provision of colored fabrics made of or containing artificial filamentary materials which are brightly colored when viewed under light in both the visible and invisible, i. e. ultra-violet, portions of the spectrum.

Another object of this invention is the provision of colored fabrics woven of colored artificial filamentary materials which exhibit a high degree of color intensity under both daylight and ultra-violet light.

A further object of this invention is to provide brightly colored fabrics of artificial filamentary materials which may be satisfactorily employed as identification panels, and the like, when viewed under both daylight and artificial light.

Other objects of this invention will appear from the following detailed description.

Fabrics of artificial filaments which have been dyed with fluorescent dyestuffs find extensive application, particularly in military operations as a ready means of unit and position identification. By projecting ultra-violet or invisible light on such dyed fabrics, the fluorescent dyestuff present is caused to emit visible light in a color dependent upon the particular fluorescent dye or combination of dyes applied to the fabric. By the proper choice of fluorescent dyestuffs, practically any color effect may be produced under the excitation of ultra-violet light. For maximum effectiveness and utility, fabric materials employed for the purpose of identification should also possess a high degree of visibility under daylight illumination.

I have now found that artificial filamentary materials possessing outstanding color intensity under both daylight as well as ultra-violet light may be obtained by incorporating a finely-divided colored fluorescent pigment in the spinning solution from which the artificial filaments are spun and then dyeing said filaments in hank, bobbin or fabric form with a fluorescent dyestuff. The presence therein of a colored fluorescent pigment not only imparts a high degree of color intensity to the filaments when they are illuminated by daylight but the combined effect of the fluorescent pigment and the fluorescent dyestuff renders the color effect produced under ultra-violet excitation outstandingly brilliant.

The colored, fluorescent filaments prepared in accordance with the novel process of my invention may have a basis of any suitable filament-forming material. The filaments may be formed by extruding a solution of the desired filament-forming material containing the desired finely divided fluorescent pigment through suitable orifices into a medium adapted to effect the formation of the filaments. Thus, for example, the filaments may have a basis of regenerated cellulose which may be made by the viscose, cuprammonium, nitro-cellulose, or any other process adapted for the production of said regenerated cellulose filaments. They may also have a basis of a synthetic linear polyamide condensation product or other suitable polymeric material, such as polyvinyl chloride, or a co-polymer of vinyl chloride and vinyl acetate. Most advantageously, however, the improved filaments formed in accordance with my invention have a basis of an organic derivative of cellulose, such as, an organic acid ester of cellulose or a cellulose ether. Examples of organic acid esters of cellulose are cellulose acetate, cellulose propionate and cellulose butyrate, or mixed esters, such as cellulose acetate-propionate and cellulose acetate-butyrate, while examples of cellulose ethers are ethyl cellulose and benzyl cellulose. The filaments having a basis of an organic derivative of cellulose may be prepared by dissolving the organic derivative of cellulose in a suitable volatile solvent, such as acetone, and extruding such solutions after the desired amount of finely-divided pigment has been added thereto, through an orifice or plurality of orifices into an evaporative atmosphere as in the dry method of spinning, or into a liquid coagulating medium as in the wet method of spinning, which spinning methods are well-known in the art.

Prior to incorporation in the spinning solution, the colored fluorescent pigment is reduced to a very finely-divided form by a suitable treatment which may comprise grinding the pigment in a ball mill, colloid mill or the like, adapted to reduce the pigment to the desired finely-divided form. Preferably the particles are reduced in size to a diameter of from less than 0.1 up to about 5 microns. The amount of pigment added will vary depending upon the particular shade which is desired in the filaments and the nature of the pigment employed. A satisfactory color of high intensity and brilliance under both daylight and ultra-violet light may be obtained by adding to the spinning solution an amount of fluorescent pigment of from about 0.01% to about 5 to 10% by weight, based on the amount of the filament forming material present in the spinning solution.

The finely-divided colored fluorescent pigment may be added at any point in the manufacture of the filaments prior to extrusion. Thus, for example, a spinning solution may be prepared with the desired amount of fluorescent pigment incorporated therein and the pigmented spinning solution thus obtained then extruded through orifices to form filaments in the manner well known to the art. Most advantageously, however, the pigments may be added to the spinning dope at a point near the spinning jet or orifices through which it is extruded so that the system employed for spinning the filaments will not be contaminated with any particular color. This avoids extensive and time-consuming cleaning operations if it is desired to spin filaments in various other colors.

Because of the extremely fine particle size of the colored fluorescent pigments, the filaments obtained possess substantially the same tenacity and elongation characteristics as filaments which do not contain a finely-divided pigment. Consequently, the colored pigmented filaments prepared in accordance with my invention may be employed satisfactorily in any application where substantial tenacity and elongation characteristics are necessary.

As examples of fluorescent pigments which may be employed to impart the desired brilliant fluorescent color to the filaments, the following may be mentioned. For a yellow fluorescent color specially prepared mixtures of zinc sulfide and cadmium sulfide, or cadmium tungstate are satisfactory. For a red fluorescent color, specially prepared zinc sulfide, or mercuric oxide, potassium dichromate, magnesium dichromate, barium chromate, thorium dichromate, rhodium thiocyanate, as well as Rhodamine BX (C. I. 749) tungstate lake and Barium red lake C toner, are suitable. For a blue fluorescent color, I may employ pigments, such as Peacock blue lake or certain blue dyestuffs in substance such as Milling Blue BC, Alizarine Blue SE. For a green fluorescent color, I have found that the addition of specially prepared zinc sulfide of a green daylight color as well as a green fluorescent color is suitable, as well as other pigments such as Brilliant Green (C. I. 662) tungstate lake or Auramine 00 (C. I. 655) tungstate lake or Malachite Green (C. I. 657) tungstate lake may be employed. A violet color may be obtained employing violet pigments such as ethyl violet tungstate lake. To obtain any other colors, the fluorescent pigments may be mixed as is well understood in the art.

The artificial filamentary materials containing the above finely-divided fluorescent pigments are then dyed with a suitable fluorescent dyestuff. The filaments may be dyed in hank or bobbin form or they may be woven into the desired fabric form and the fabric obtained then dyed in the piece. In dyeing the pigmented artificial filamentary materials, any suitable fluorescent dyestuff having an affinity therefor may be employed. Thus, for example, where the pigmented artificial filaments have a basis of regenerated cellulose, dyestuffs such as Chlorazol Yellow 2GS, Immedial Yellow GG (C. I. 955), Primuline AS (C. I. 812), Oxamine Red BN, Thiazine Red 6XX, Thioflavine S (C. I. 816) or Diamine Rose BD (C. I. No. 128) may be employed, yielding textile materials dyed in yellow, red or pink colors. Where the fluorescent pigmented filaments have a basis of cellulose acetate or other organic derivative or cellulose, dyestuffs such as, for example, Alizarin Blue SAPX (C. I. 1054), Rubine AW (C. I. 677), Alizarin Green CG (C. I. 1078), Rhodamine 6G (C. I. 752), Auramine 0 (C. I. 655), Thioflavine T (C. I. 815), Calconese Fluorescent Yellow, Calconese Invisible Blue, and Navy Blue R (C. I. 922 and 680) are satisfactory for dyeing the materials in fluorescent blue-pink, violet-blue, pink and blue shades. Where the artificial filamentary materials have a basis of a synthetic linear polyamide condensation product, fluorescent dyestuffs such as, Rhodamine B (C. I. 749), Milling Orange G, Milling Red G, or Ink Blue G (C. I. 707) are satisfactory. The dyebaths employed may contain from about 0.1 to 1% or more by weight of fluorescent dyestuff on the weight of the dyebath and dyeing may be effected at temperatures of 150 to 190° F., but optimum results are achieved at temperatures of 170° F.

Fluorescent pigmented yarns of high tenacity may be obtained by subjecting those pigmented yarns having a basis of cellulose acetate, or other organic acid ester of cellulose, to a stretching operation whereby the filaments are stretched to 200, 300, 500 or even 1000, to 2000% of their original length. The yarns may be stretched to the desired degree when they are in a somewhat softened condition, which condition may be obtained by treating the fluorescent pigmented cellulose acetate, or other organic ester of cellulose yarns with organic solvents, latent solvents, or swelling agents therefor, or by subjecting the yarns to the action of hot water or steam at elevated temperature or pressure. The stretching of the yarns may be effected during, continuously with, or after their formation and the stretched yarns may then be taken up in suitable package form. The stretching operation causes cellulose acetate yarns to acquire a relatively high tenacity and this increased tenacity may be enhanced by subjecting the stretched cellulose acetate or other organic acid ester of cellulose yarns to saponification with a suitable alkaline medium.

The saponifying agent employed may be inorganic, such as, for example, sodium hydroxide, potassium hydroxide, ammonium hydroxide or other organic basic agent, or may be an organic saponifying agent, such as, methylamine, ethylene diamine, triethanolamine, or other organic base. The saponifying agents may be employed in varying concentrations in aqueous, alcoholic or aqueous/alcoholic solutions and saponification may be effected satisfactorily at temperatures of 20 to 100° C.

The stretched, fluorescent pigmented cellulose acetate or other organic acid ester of cellulose yarns may be dyed after stretching with any desired fluorescent dyestuff having an affinity for said cellulose acetate or other organic acid ester of cellulose materials, or the stretched yarns may be dyed after saponification with a suitable fluorescent dyestuff having an affinity for the regenerated cellulose materials produced by the saponification process. The finely-divided fluorescent pigment does not affect the tenacity of the stretched and saponified yarns and they may be employed wherever such fluorescent yarns of high tenacity characteristics are desired.

In order further to illustrate my invention, the following example is given:

Example

Cellulose acetate filaments containing a finely-divided fluorescent pigment are prepared by adding one part by weight of specially prepared zinc sulfide, fluorescent in a red color, to a solution containing 25 parts by weight of cellulose acetate in 75 parts by weight of 95/5 acetone/water solution and then extruded the mixture obtained under pressure through a spinning jet into an evaporative atmosphere where the volatile solvent is removed and the desired pigmented filaments are formed. The filaments obtained are woven into a fabric of satin weave and then dyed six ends on a jig with a dyebath containing 1 part by weight of Rhodamine B dissolved in 250 parts by weight of water and 63 parts by weight of 90% formic acid at a temperature of 170° F. After being rinsed, neutralized, rinsed and dried, the dyed fabric exhibits a brilliant red color when viewed under daylight and an intense brilliant red color when illuminated by ultra-violet light.

It is to be understod that the foregoing detailed description is given merely by way of illustration and that many variations may be made therein without departing from the spirit of my invention.

Having described my invention what I desire to secure by Letters Patent is:

1. In a process for the production of colored, fluorescent artificial filamentary materials of high color intensity under visible as fell as ultra-violet light illumination, the step of dyeing cellulose acetate filamentary material having incorporated therein a finely divided pigment consisting of zinc sulfide fluorescent in a red color, with an aqueous formic acid solution of a fluorescent dyestuff consisting of the hydrochloride of diethyl-m-amino-phenolphthalein.

2. Colored, fluorescent cellulose acetate filamentary materials of high color intensity under visible as well as ultra-violet illumination having a finely divided pigment consisting of zinc sulfide fluorescent in a red color incorporated therein and colored with a fluorescent dyestuff consisting of the hydrochloride of diethyl-m-amino-phenolphthalein.

ROBERT G. DORT.

REFERENCES CITED

The following references are of record in the file of this patent:

UNITED STATES PATENTS

| Number | Name | Date |
|---|---|---|
| 868,779 | Hammer | Oct. 22, 1907 |
| 1,096,644 | Saubermann | May 12, 1914 |
| 2,152,856 | Switzer | Apr. 4, 1939 |
| 1,791,199 | Gardner | Feb. 3, 1931 |
| 1,885,591 | Coulthard | Nov. 1, 1932 |
| 1,956,948 | Fattinger et al | May 1, 1934 |
| 1,980,519 | Grunzig et al | Nov. 13, 1934 |
| 2,033,976 | Dreyfus | Mar. 17, 1936 |
| 2,128,338 | Whitehead | Aug. 30, 1938 |
| 2,160,839 | Dreyfus | June 6, 1939 |

FOREIGN PATENTS

| Number | Country | Date |
|---|---|---|
| 275,553 | Great Britain | May 25, 1928 |
| 348,094 | Great Britain | Oct. 31, 1929 |
| 579,896 | France | Aug. 16, 1924 |
| 656,997 | France | May 14, 1929 |

OTHER REFERENCES

Silk Journal and Rayon World for June, 1944, page 40.